Oct. 4, 1955        A. CACIAGLI        2,719,346

MOLDING APPARATUS HAVING VIBRATING MEANS

Filed Aug. 1, 1952 under
United States Patent Office 2,719,346
Patented Oct. 4, 1955

2,719,346

MOLDING APPARATUS HAVING VIBRATING MEANS

Armando Caciagli, Milan, Italy

Application August 1, 1952, Serial No. 302,094

Claims priority, application Italy June 14, 1952

2 Claims. (Cl. 25—45)

Vibration is the most modern procedure used in industrial practice to compact agglomerated materials in moulds in order that they may completely fill the mould cavity, initially used for its direct stuffing action in the building industry for the making of reinforced concrete, vibration was afterwards used on special machines such as machines for the making of concrete blocks, vibrating tables, etc. intended for the shaping of prefabricated element of common use in the building industry.

With these intermittent operating machines and with a variety of limited production of the type and sizes of the moulds, shaping attempts were made in working cycles in industries other than the building one and in particular the ceramic industry.

The unsuccessful attempts of various kinds which occurred in these endeavours should be in part attributed to the fact that only the analogy of the operations was kept into account and not that of the most different uses for which the shaped pieces were destined. The work of the machines, made for the construction of concrete blocks, is finished with the shaping operation: the pieces which are produced by these machines will be used after a more or less short period of seasoning. However, in the working cycles, where the process of shaping is followed by heat treatments, the uniformity of the structure of the masses, from which the final success of the products depends, acquires particular importance. Moreover, in certain industries, for example the ceramic industry, it is necessary to produce pieces in form and sizes different from one another, in designs often very complicated and in quantities which vary from small units to many thousands of identical specimens. The shaping machines, with which we are acquainted to date, are on the contrary characterized by a limited flexibility of production, more so since the moulds, even though replaceable, are always an integral part of the machine.

The object of the present invention is an apparatus based on a procedure of continuous operation which employs independent, movable moulds; the material is vibrated and compressed while the moulds which contain it are in movement between the entrance and exit of the shaping machine. In this manner it is possible to produce a continuous series of pieces not only equal between themselves, as are obtained also from other known machines, but also different between themselves with the elimination of the strict interdependent binding between the machine and mould. Moreover, the moulds can be of the most convenient design for obtaining uniform products.

Of course it is understood that the apparatus is also suitable for the shaping of any material other than refractory materials, for example, concrete or similar materials. This apparatus is made up essentially of a working cycle which includes a filling point, a shaping point, a point of removal from the mould, a conveying device, a series of carriages which can be connected with or disconnected from the conveying device, a set of interchangeable moulds, either different or similar, which can be fitted on the carriages or removed from same. When similar pieces are to be made in large numbers, similar moulds can be used whereas, when the pieces must be of different shapes, it is possible, with the above mentioned apparatus, to use different moulds. The filling and removing points can be of any known type automatically operated, hand driven or combined. The shaping machine consists of a beam which vibrates continuously and on which the conveying device, also continuous, moves the carriages which hold the moulds. These carriages are pressed contemporaneously against the vibrating beam by means of a suitable pressing device. Such apparatus permits the vibration and compression of a large number of moulds which follow one another continuously and in succession even though variable during the operation.

Figure 1:
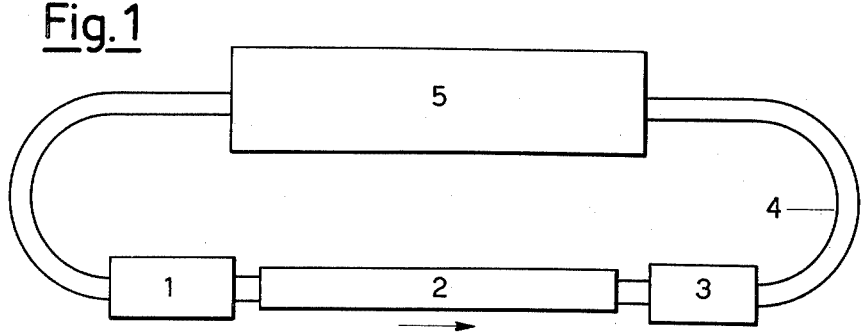
Figure 1 is a diagrammatic view of the apparatus with the layout of the accessories.

The diagrammatic view of the apparatus (Fig. 1) shows the working cycle which includes the filling point of the moulds 1, the shaping machine, generally identified by the numeral 2 and the removing point of the pieces produced 3. The carriages which carry the moulds move on guide rails which, along the length of the vibrating beam, are replaced by the upper surface of the beam itself. The return of the empty moulds, from the point of removal to that of refilling, is effected by means of auxiliary rails 4 which permit the continuous utilization of a convenient number of moulds and includes a sorting point 5. This latter point permits the performance of supplementary operations on the moulds and the replacement of the moulds which are used in the working cycle by simply changing the service carriages without stopping the working apparatus. To this effect the apparatus is provided with a larger number of carriages than those which are used in the working cycle, so as to always dispose a few non-travelling carriages at location 5 for the replacement of the moulds.

The movement of the carriages across the shaping machine 2, from the filling to the removal point, is effected by the conveying device which runs at adjustable speed to vary the time during which the material about to be shaped is subject to the action of the machine itself.

The movement of the carriages, carrying the moulds on the remaining portion of the rails, can be always obtained by means of the same conveying device or by means of another method suitable to obtain the same results. The vibrating beam can be made of a single piece developed in length or of a certain number of distinct, successive parts.

Figure 2:
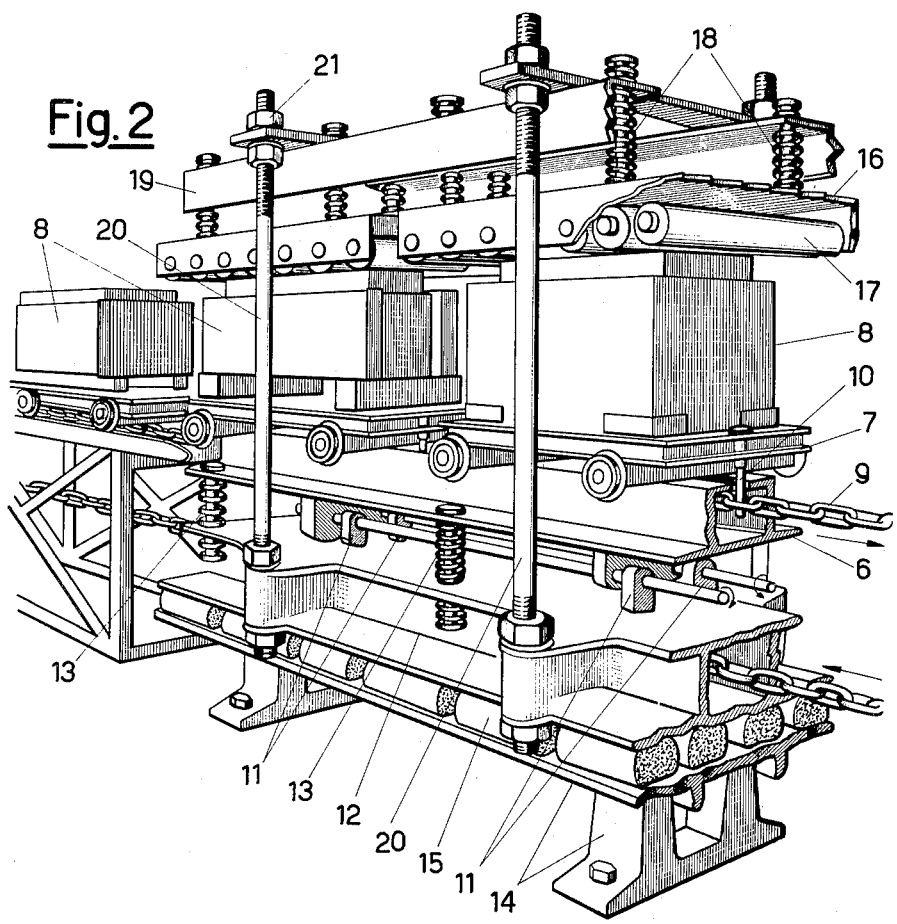
Figure 2 is a perspective view, partly broken away and in cross-section of a constructional example of the shaping machine with the vibrating beam and pressing equipment. The complete machine is actually four times greater in length than as shown in Figure 2.

In the constructional example represented by Figure 2, there is a beam 6 on the carriages 7, which carrying the movable moulds 8, are slidably supported during travel through the machine 2. The carriages with the moulds thereon are pulled by the conveying device, which, in the constructional example, consists of an endless chain 9 driven by means of a motor and reduction gears of known type. The motor and reduction gears are not shown in the drawing. The carriages are connected to the chain by means of pins 10 which, when pulled out from the top, come out of the links of the chain and disconnect the carriages from the chain when necessary.

As seen in Fig. 2 of the drawing, each of the carriages 7 includes a platform on which the supported mould is carried, and cross-members extending laterally across the under side of the platform and rotatably carrying flanged wheels at the opposite ends thereof. During the movement of the successive carriages to and from the vibrating and compressing machine 2, the flanged wheels roll on the rails 4, but during the passage of the carriages through the machine 2, the cross-members at the under side of the carriages slide upon the beam 6 which is laterally smaller, at least at the surface contacted by the cross-members, than the span between the flanged wheels. In order to facilitate the transfer of the successive carriages 7 from the rails 4 to the beam 6, the ends of the rails adjacent the entrance to the machine 2 are sloped downwardly, as seen in Fig. 2, so that each carriage is lowered, as it passes off the rails, onto the beam 6.

Beam 6 is equipped with a well known vibrating device operating at any given frequency or with a shaking device according to the requirements of production. A single direction vibrating device is shown in Figure 2 with multiple parts acting on the total length of the frame which consists of several pairs of eccentric masses 11 fitted on two shafts turning in opposite directions and at the same speed. The vibrating beam is sustained on the frame 12 by means of elastic supports 13. The frame in turn lays on the bed 14 and is separated from the latter by elastic cushioning members which prevent the transmission of vibrations to the foundation of the machine.

A hold-down assembly is fitted on the upper part of machine 2 and includes sets of rollers acting downwardly on the upper surfaces of the moulds 8 as the latter are carried through the machine by the respective carriages sliding on beam 6.

In the embodiment of the invention illustrated in Fig. 2, the hold-down assembly is shown to include an upper beam 19 supported above beam 6 on standards 20 and adjustable vertically on the latter by rotation of securing nuts 21. A plurality of separate bonnets 16 are suspended from upper beam 19 by suitable springs 18, and each of these bonnets rotatably supports a series of rollers 17 with the axes of the latter extending laterally. The springs 18 urge the bonnets 16 downwardly to press the rollers 17 against the upper surfaces of moulds 8 traveling through the machine, and the resilient suspension of the bonnets will ensure that the rollers remain in rolling contact with the upper surfaces of the successive moulds even when the levels of said upper surfaces vary slightly from mould to mould. However, if there are substantial differences in the vertical dimensions of the moulds traveling through the machine, the upper surfaces of the moulds are substantially levelled by placing shims of suitable thickness between the shorter moulds and the respective carriage platforms, as shown in the left hand portion of Fig. 2.

The pressure exerted downwardly by rollers 17 on the successive moulds can be varied by adjusting the springs 18, by adding weights to the bonnets 16 or the like.

When it is inconvenient to have the rollers 17 in actual contact with the top surfaces of the moulds, a train of articulated panels (not shown), each as large in planform as the moulds, can be interposed between the top surfaces of the moulds and the rollers and fed through machine 2 with the moulds.

What I claim is:

1. Moulding apparatus comprising an elongated beam, means for continuously vibrating said beam, interrupted rails terminating adjacent the opposite ends of said beam, a series of mould supporting carriages each having wheels at the opposite sides thereof to roll on said rails in moving to and from said beam, said carriages sliding directly on said beam during movement along the latter, conveyor means moving continuously along said rails and said beam and connected to said carriages for conveying the latter along said rails, over said beam and back onto said rails, interchangeable moulds removably mounted on said carriages, and compressing means above said beam operative to yieldably press downwardly upon the successive moulds as the respective carriages slide along said vibrated beam.

2. Moulding apparatus according to claim 1; further comprising a machine bed, a frame above said bed, cushioning means interposed between said frame and bed to prevent the transmission of vibration from said frame to said bed, means yieldably supporting said beam on said frame, and means mounting said compressing means on said frame.

References Cited in the file of this patent

UNITED STATES PATENTS

| | | |
|---|---|---|
| 1,740,711 | Pelton | Dec. 24, 1929 |
| 2,319,313 | Flam | May 18, 1943 |
| 2,407,168 | Lindkvist | Sept. 3, 1946 |

FOREIGN PATENTS

| | | |
|---|---|---|
| 716,279 | France | Oct. 6, 1931 |
| 58,380 | Denmark | Jan. 27, 1941 |